United States Patent [19] | [11] 4,104,108
Kishida et al. | [45] Aug. 1, 1978

[54] PLASTIC BAG FORMING AND SEALING APPARATUS

[75] Inventors: Shizuaki Kishida; Misao Takahashi, both of Atsugi, Japan

[73] Assignee: Sanyei Corporation, Tokyo, Japan

[21] Appl. No.: 739,987

[22] Filed: Nov. 8, 1976

[30] Foreign Application Priority Data

Dec. 6, 1975 [JP] Japan ................................ 50-145226

[51] Int. Cl.[2] ......................... B32B 31/00; B30B 15/34
[52] U.S. Cl. ...................................... 156/510; 156/583
[58] Field of Search ................................ 156/583, 510

[56] References Cited

U.S. PATENT DOCUMENTS 3,672,116 6/1972 Ingmarson ........................... 156/510
3,847,712 11/1974 Hubbard .............................. 156/583
4,021,290 5/1977 Smith .................................. 156/510

*Primary Examiner*—Douglas J. Drummond
*Attorney, Agent, or Firm*—Ostrolenk, Faber, Gerb & Soffen

[57] ABSTRACT

A plastic bag forming and sealing apparatus including a container for a roll of plastic to be formed into bags, the side margins of the roll are presealed to form the plastic into a tube; the roll is unwound to the desired extent, the cover of the container is closed to hold the unwound plastic in place, a blade is moved across the roll to shear the desired length of a plastic bag, with the cover still closed, heat seal means seals the open end of the tube completing the formation of an open sided bag or pouch to be filled.

16 Claims, 6 Drawing Figures

PLASTIC BAG FORMING AND SEALING APPARATUS

BACKGROUND OF THE INVENTION

The present invention relates to an apparatus for forming a plastic bag and for sealing the open end of a plastic bag. The plastic bags formed and sealed by the apparatus of the invention are primarily intended for the storage and preservation of food stuffs. But, of course, they may be used for holding any objects.

Apparatus for sealing the open end of a plastic bag are known. U.S. Pat. No. 3,847,712 shows a sealing apparatus having an oblong, rectangular cross-section heat conductive member which is heated. The heat conductive member has a knife edge formed on one side thereof and extending along its length. The heat conductive member is rotatable around its longitudinal axis so that either the knife carrying surface or another surface may be selected to contact a plastic bag laid over the conductive member. With the knife edge contacting the bag, in the case of an ordinary plastic bag comprised of a single layer of plastic, melt trimming or sealing of the bag is performed by the knife edge. With the heat conductive member rotated so that another edge thereof contacts the plastic bag, the open end of the bag may be sealed with a heat seal band, as occurs with so-called boiler bags that are comprised of two layers of plastic.

Known heat seal apparatus are usually used with completed plastic bags of previously determined size. The size of the bag may be considerably greater than the capacity required to hold the amount of material intended to be inserted therein. This is uneconomical and in connection with boilable bags, is quite high in cost. One way in which this problem is handled is to sell bags of various sizes. But there is no limit to the kinds and sizes of food or other storable objects that are bagged in a typical household. As a result, even with a full selection of bag sizes, it is not unusual to have a bag considerably larger than the item to be held.

Furthermore, conventional bag forming apparatus do not include means for cutting off part of a boilable bag or the like. It has thus become necessary to employ a separate scissors for forming a cut at the end of a bag for the purpose of initiating removal part or the end of the bag.

It is space consuming to store the bags of various sizes now offered for sale. Furthermore, it is difficult to maintain an accurate count of the total number of bags of every size remaining available, whereby it is quite difficult for the consumer to determine when he must order an additional supply of a particular size bag.

SUMMARY OF THE INVENTION

The present invention concerns a heat seal, bag forming apparatus including cutting means for cutting an appropriate length of plastic material from a roll thereof in order to form a bag of a precise desired size coupled with separate heat seal means that are spaced from the cutting device, whereby the plastic may be cut to a particular length and then may be sealed to form a pouch of predetermined size which is thereafter to be filled. The cutting blade is movable across the apparatus to slice through the plastic bag material as it is securely clamped in position. The heat seal device also seals the bag material as it is clamped in position. Because the cutting means and the heat seal means are separated from each other, the cover of the apparatus can be closed to hold the plastic in place to both cut and then seal a bag, without raising the cover or releasing or moving the plastic.

It is the primary object of the present invention to enable the manufacture of plastic bags of selected variable size.

It is another object of the invention to be able to cut a plastic bag and seal it without disturbing the plastic material between the two procedures.

DETAILED DESCRIPTION OF A PREFERRED EMBODIMENT

Figure 1:
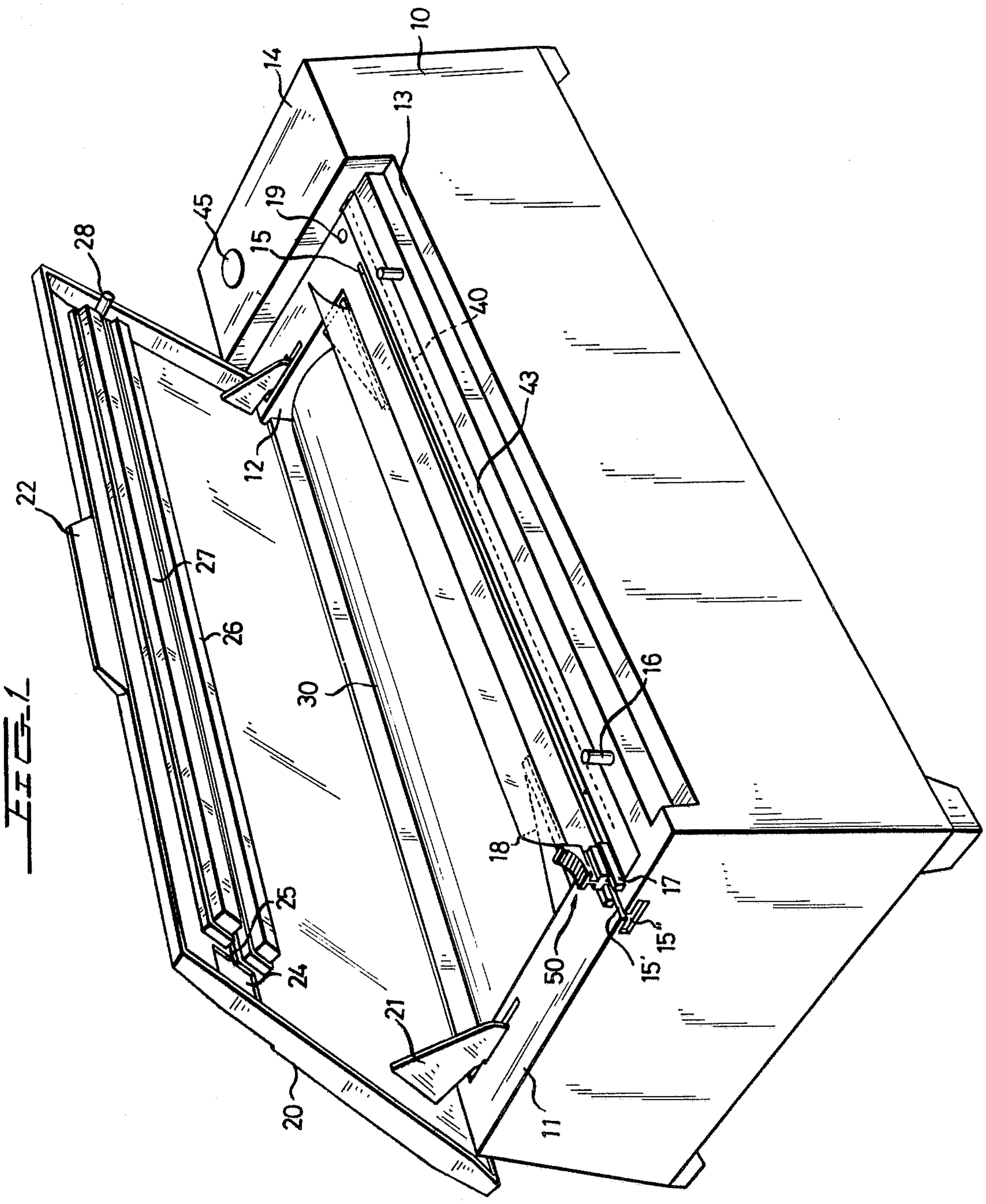
FIG. 1 is a perspective view of a heat seal apparatus according to the invention with the top cover open.

A heat sealing apparatus according to the present invention is in and on the casing 10. Extending into the casing 10 from the top side 11 and located toward the rear of the casing there is a large recess 12 for accommodating a continuous roll 30 of plastic bag forming material.

Projecting from the side walls of the recess 12, and located toward the top end of the recess are the plastic sheet guides 18 for guiding the unwinding of the sheet 31 from its roll 30. The guides 18 are positioned toward the front of the recess 12 but are spaced rearwardly of the front wall to define a space through which the sheet is pulled.

Above the upper surface 11 of the casing 10 a cover 20 is pivotally supported to open and close by the hinge mechanism 21. The slot 13 at the front edge of the casing 10 provides access for opening of the cover 20. The cover 20 has forward projection 22 on it for being grasped to open the cover.

Two protrusions 16 at the top surface 11 at the front of the casing 10 are spaced and positioned to be received in the holes 33 in the margins of the below described unrolled plastic sheet 31 to support the plastic sheet. The spacing of protrusions 16 correspond to the separation of corresponding holes 33 in opposite margins 32 of sheet 31.

Figure 4:
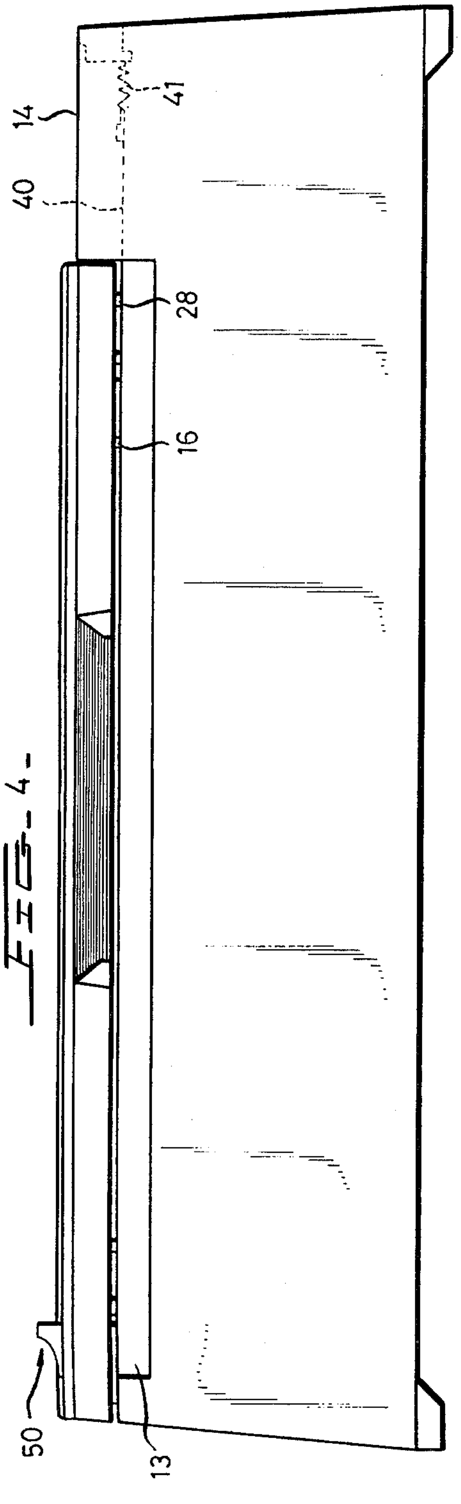
FIG. 4 is a front elevational view of the heat sealing apparatus.

An electrically heatable wire 40 of conventional type extends in a straight line across the top of the casing 10 over a greater length than the width of the recess 12 and the wire is located between the recess 12 and casing front edge groove 13. One end of the wire 40 is directly secured to the casing 10 at the left in FIG. 1. The other end of the wire runs to the side 14 of the casing and the wire is pulled to the right in FIG. 4 by a wire tensioning spring 41 inside the side 14 of the casing 10.

A band or layer 42 of electrical insulating and heat insulating material is disposed atop the casing 10 and beneath the heating wire 40 to protect the casing. A thin tape 43 comprised of glass extends over the wire 40 and is secured to the upper surface 11 of the casing 10. The tape 43 secures the wire 40 in place, protects the wire against undesirable contact which might shift it, is thin enough to enable the heat to be transmitted from the wire to the plastic bag placed on the glass tape 43 and the glass tape itself enables the bag to be peeled off the heat sealing apparatus once the bag has been heat sealed.

An elongated slot 15 is defined in and passes through the upper surface 11 of the casing 10 and is placed parallel to and slightly rearwardly of the heating wire 40. Slot 15 is also longer than the width of the recess 12. A slot 15' extends in from the left side of the casing 10 in FIG. 1 toward the slot 15 and is offset slightly rearwardly of the slot 15 on the casing 10. The slot 15' connects with the slot 15 through a rectangular connection opening (not shown) of a size sufficient to accommodate the below described cutter 50. The side wall of the casing 10 is provided with a widened opening 15'' beneath the slot 15' such that the cutter 50 may pass out of the casing 10 along the slot 15' and through the slot 15''.

A platform 17 is seated on casing upper surface 11 above slot 15' to support and place cutter 50 when the cover 20 is open. The height of the platform 17 is selected so that the cutter 50 will move smoothly into the slot 25 in the cover and the groove 55 in the cutter will be properly placed to receive the edges of the cover defining slot 25. Consequently, the vertical height of the cutter 50 will remain constant in its motion across the casing 10.

In FIG. 1, the cutter 50 is shown seated on a platform 17, with the cutter in the slot 15'.

Figure 2:
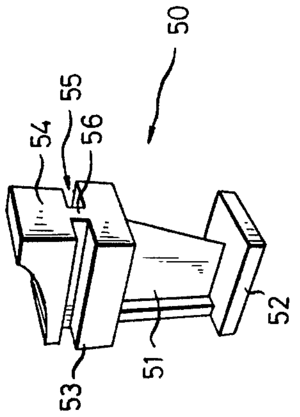
FIG. 2 is a perspective view of the plastic bag cutting means used in the heat sealing apparatus.
Figure 3:
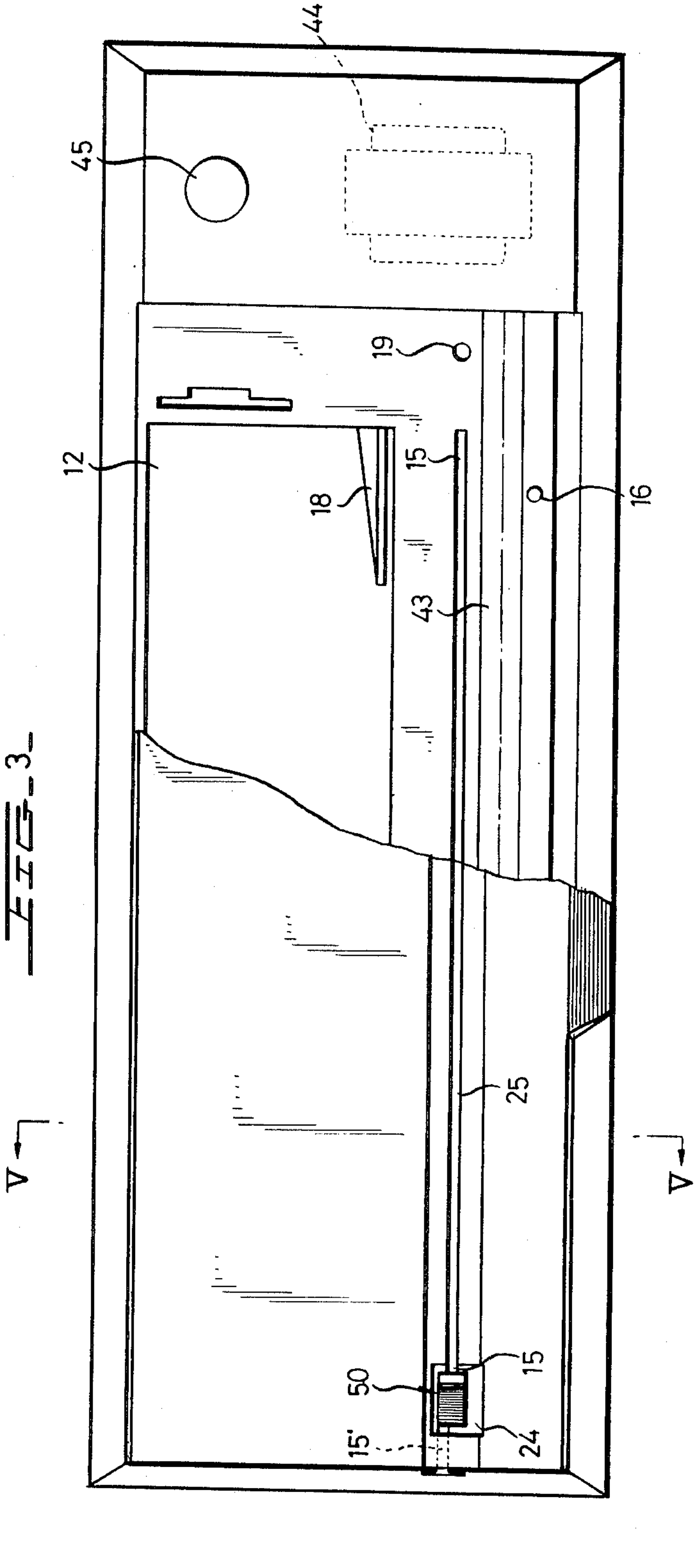
FIG. 3 is a top plan view, with the cover closed and with part of the cover cut away, of the heat sealing apparatus.

The cutter 50 is a separate element from the rest of the apparatus and is comprised of a vertically oriented blade member 51 with a cutting edge that faces to the right in FIGS. 1–3, a lower guide plate 52 which extends out from both sides of blade 51 and is beneath and is perpendicular to the blade 51, an upper guide plate 53 which also extends out from both sides of blade 51 and is above the blade member 51 and is perpendicular thereto, a manually graspable operating part 54 above and spaced from the upper guide plate 53 and which projects above the upper surface 11 of the casing 10 and above cover 20 when it is closed, and a connecting portion 56 which holds the operating part 54 and the upper guide plate 53 together. The height of the grooves 55 is selected to correspond to the thickness of the cover 20 at the guide slot 25 along which the guide grooves 55 are guided such that when the cutter 50 is moved along the slot 15, cover 20 receives the guide grooves 55 along both sides of the blade 51 and the cover 20 will guide the motion of the cutter 50.

The cover 20 has a hole 24 passing through it at its left hand end in FIG. 1. The hole is placed so that when the cutter 50 is on the platform 17, and the cover 20 is closed, the operating part 54 of the cutter passes through the hole 24. The cover 20 has an elongated slot 25 extending along its length from hole 24. Slot 25 is aligned with the slot 15 in casing 10 when the cover 20 is closed. The slot 25 is of narrowed width such that the material of the cover 20 defining the slot 25 is inside the grooves 55 of the cutter and the cutter is thereby guided in its motion by the cover 20.

Figure 5:
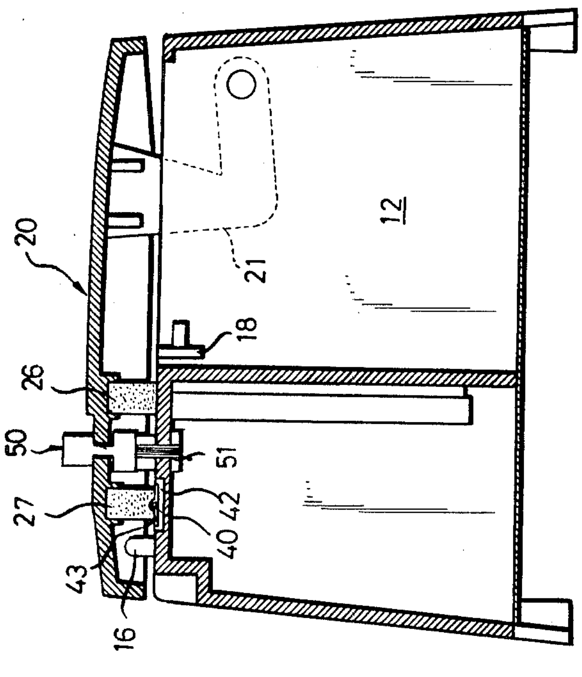
FIG. 5 is a cross sectional side elevational view of the heat sealing apparatus along the line V—V of FIG. 3.

Attached on the underside of the cover 20 and spaced slightly away from and at opposite sides of the slot 25 are heat resistant elastic bodies 26, 27 which extend the length of the cover 20. The bodies are shaped and positioned such that when the cover 20 is closed, the bodies contact the upper surface 11 of the casing 10 and are located at both sides of the slot 15 and the elastic body 27 is so placed as to press against the top of the glass tape 43 (FIG. 5).

A switch to the power supply may be associated with the cover 20 such that when the cover is pressed down strongly, the power supply is activated to heat the wire. In the preferred arrangement, the underside of the cover carries a protrusion 28 which extends into a correspondingly shaped and positioned hole 19 into the upper surface 11 of the casing 10. There is an appropriate switch (not shown) inside the hole 19 which is activated by the mechanical force of the protrusion 28 and this activates the heating means. The wire 40 is connected through a transformer 44 to a conventional power supply (not shown) and the activation of the switch in hole 19 applies an appropriate voltage e.g., approximately 10 volts, to the wire 40 to cause it to be heated. To signal that the power supply is operating, a pilot lamp 45 in circuit with the heated wire is lit.

Figure 6:
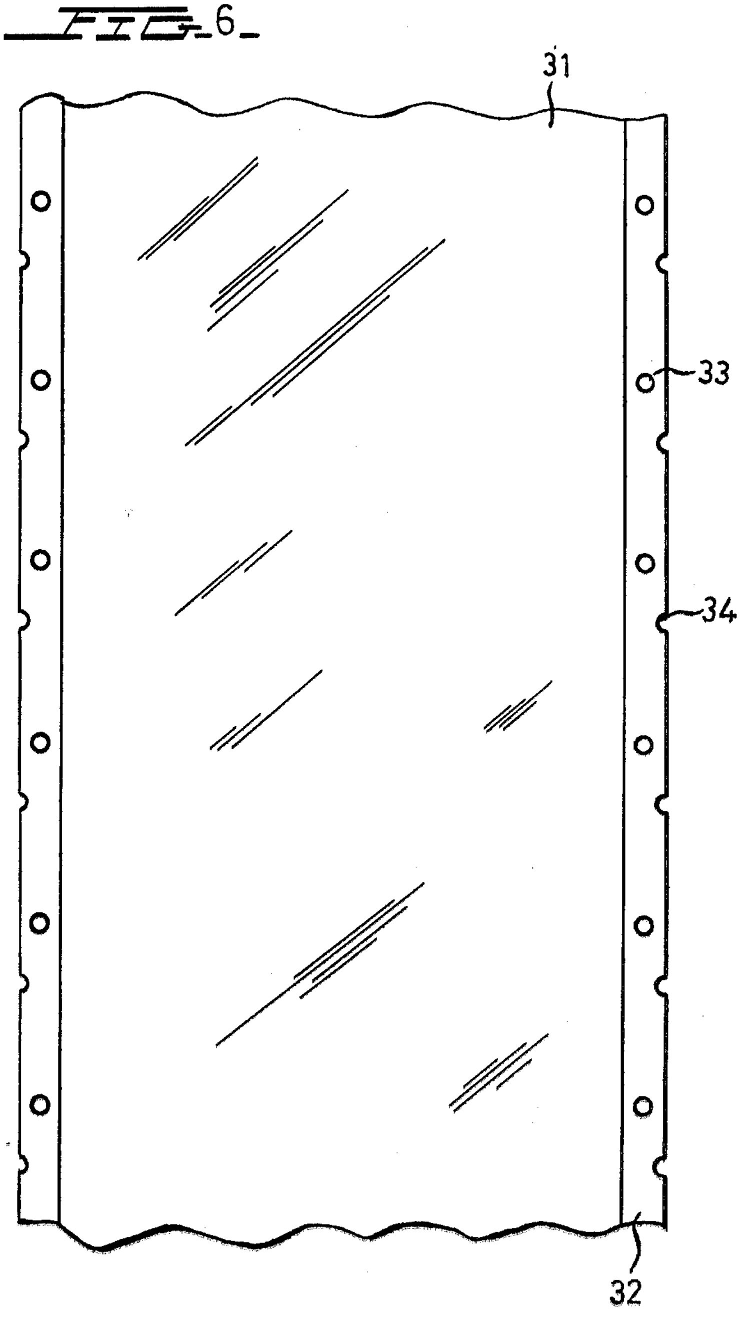
FIG. 6 is a view of a sheet of plastic material adapted for use with the present invention.

The roll 30 of plastic material which is inserted into the casing recess 12 is obtained by rolling a hollow sheet 31 of the type shown in FIG. 6. Sheet 31 is comprised of two belt-like compound layers each comprising an outer higher melting point, plastic layer, such as a polyester, and an inner, lower melting point, plastic layer, such as a polypropylene, with both side margins 32 of these layers being sealed together. A large number of spaced apart small sized holes 33 are provided along the side margins 32 with corresponding holes 33 on the opposite side margins being aligned along the length of the sheet 31. In addition, a large number of marginal indent cuts 34 are provided at spaced apart intervals along the side margins 32 with corresponding cuts 34 on opposite side margins being aligned. The cuts 34 are spaced from the holes 33. The holes 33 are used for positioning and holding the plastic sheet for sealing and cutting with the heat sealing apparatus. The cuts 34 can be guide openings as to where the completed plastic bags are to be torn open to dispense their contents after they have been sealed.

To make a hollow tubular sheet 31 of the type shown in FIG. 6, two pairs of heatable rollers (not shown) are positioned to be spaced apart the distance desired between the side margins 32. Two of the above described belt like compound layers are overlaid one on the other and are continuously passed between the heated rollers, thereby fusing the side margins of both belts to form an elongated hollow sheet. Simultaneously with this or subsequent thereto, the holes 33 and the cuts 34 are formed by passing the assembled composite through a punching device.

The heat sealing apparatus just described operates in the following manner. A sheet 31 in the form of roll 30 is positioned within the accommodating recess 12. The free end of the sheet is pulled out of the recess 12 toward the front of the casing 10 and past the guide 18.

After the proper length of sheet 31 has been unwound from the roll 30 to a desired extent for a particular depth plastic bag, the sheet 31 is positioned so that the appropriate small holes 33 in its side margins 32 are settled over the protrusions 16 on top of the casing 10. The cover 20 is now closed. The elastic bodies 26, 27 on the underside of the cover 20 securely hold the hollow sheet 31 in position for the subsequent cutting and/or heat sealing operation.

The operating part 54 of the cutter 50 projecting through the hole 24 is manually grasped and the cutter is moved off platform 17 along and through slots 25 and 15 across the casing 10 to the right, and then it is returned to its starting position. This cuts the hollow sheet 31 to the selected length. Because the slots 15 and 15' are offset, as the cutter 50 is returned to the platform 17, the cutter strikes the inside of the casing at the left in FIG. 1 and does not fall free of the slot 15 or 15'. It is only when the cutter is deliberately moved rearwardly through the casing 10 at the connection between slots 15, 15' that the cutter can be removed through the slot 15', 15''.

Once the sheet 31 has been cut, the power supply (not shown) to the heating wire 40 is activated while the cover is closed. The protrusion 28 beneath the cover 20 activates the switch inside the hole 19 when the cover is pressed down tightly. The cover is held down tightly for a period of time, such as approximately 10 seconds, which is sufficient to seal the sheet 31. While the cover is compressed, the low voltage, of approximately 10 volts is applied to the heating wire 40. The generated heat fuses the overlaid inner layers of the hollow sheet together, forming a bag or pouch with a still open side, through which the bag is filled.

The heat resistant elastic body 27 presses upon the open end of the bag both at the time when the bag is being cut from a longer roll 30 and subsequently when the bag is being heat sealed. The elastic bodies 26, 27 which are on opposite sides of the below described cutter 50, keep the plastic material in position before, during and after the cutter moves across the sheet and cuts a bag. Also, the elastic body 27 holds the cut bag properly positioned for it to be heat sealed, with the result that a perfect heat seal is created.

When the cover 20 is opened, the formed bag (not shown) is removed. Opening of the cover also opens the switch to the wire 40.

After the bag has been loaded with food stuffs, or the like, its still open end is placed on the upper surface 11 of the casing 10. The uppermost holes 33 at both margins 32 of the bag are placed onto the respective protrusions 16. The cover 20 is closed and pressed downward again and the open end of the bag is sealed closed.

With the heat sealing apparatus according to the invention, it is possible to prepare a plastic bag having the size and depth that is suitable for a particular quantity or size of food stuffs, or the like, which is to be stored. It is possible to produce bags which are much less expensive than the pre-made standard size bags now sold. Because the cutter 50 can be easily applied to and removed from the casing 10, the cutter 50 is easily exchanged when its cutting edge becomes dulled. Also, the roll 30 is observed each time the cover 20 is opened, whereby the remaining quantity of plastic sheet 31 available for producing bags can be observed and additional plastic can be acquired before the operator runs out of bag-making materials. Furthermore, there is little possibility of loss of bags, as occurs in other conventional sealing apparatus.

Because the heat generating wire 40 operates at low voltage and, comparatively speaking, does not achieve too high a temperature, it is possible to not only seal the compound bags having the low melting point layer, but also to seal single layer plastic bags, by appropriately adjusting the time interval during which the cover 20 is pressed down on the bag and during which the wire 40 is heated.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. Apparatus for forming and sealing plastic bags or the like, comprising:

- a casing having a surface;
- heating means at said surface and extending across said casing for heating a bag to seal it, when the bag is at said casing surface and said heating means is activated to heat;
- means for activating said heating means;
- a bag material cutter spaced away from said heating means and operable to cut a bag from a length of plastic held in the cutting pathway of said cutter;
- a cover over said casing surface and connected with said casing; bag material support means being disposed to be beneath and supported on said cover and engageable with bag material to hold same against said casing surface as said heating means is activated and to hold same in the cutting pathway of said cutter; said cover being raisable off and to raise said support means off said casing surface;
- said cutter being movable across said casing; said cutter including a blade to cut the bag material as said cutter is moved;
- cutter guide and support means in said cover and shaped and positioned to be engaged by and to guide said cutter in motion thereof across said casing.

2. The apparatus of claim 1, further comprising a switch in said casing connected with said heating means activating mean for activating it; a switch operator in said cover adapted to engage and to operate said switch once said cover is closed to said casing surface, thereby to cause said activating means to activate said heating means.

3. The apparatus of claim 1, wherein said cutter guide and support means comprise a slot in said cover, said slot extending in a direction across said casing; said slot being defined by opposed side walls of said cover; said cutter being shaped to engage said cover slot defining side walls and thereby to be guided in its motion by those said side walls.

4. The apparatus of claim 3, wherein said cover extends across said heating means; said bag material support means being attached to said cover on the side of said cover facing said casing surface.

5. The apparatus of claim 4, wherein said bag material support means comprise two spaced apart supporting elements movable into contact with said casing, to engage bag material against said casing surface and being located on opposite sides of said cover slot.

6. The apparatus of claim 5, wherein one said supporting element is so placed on said cover as to be moved into engagement with said heating means, thereby to squeeze bag material against said heating means when said cover is closed against said casing surface.

7. The apparatus of claim 5, further comprising supply support means in said casing for a supply of bag material; said cutter being disposed on said casing between said supply support means and said heating means.

8. The apparatus of claim 7, wherein said supply support means comprises a recess in said casing for receiving and holding bag material.

9. The apparatus of claim 7, further comprising positioning elements on said casing surface to be engaged by the bag material removed from said supply support means, thereby to define the position on said casing of the bag material until said cover is closed.

10. The apparatus of claim 3, wherein said cutter is separable from and removable from said casing and said cover.

11. The apparatus of claim 10, further comprising a guide slot in said casing surface aligned with said guide slot in said cover for receiving and guiding said cutter, whereby said cutter is guided by both said cover guide slot and said casing guide slot.

12. The apparatus of claim 11, wherein said casing guide slot includes an entrance section which opens at a side wall of said casing; and said cutter being removable from and insertable into said casing through said entrance section of said casing slot.

13. The apparatus of claim 12, wherein said entrance section is offset from said casing guide slot; a connecting section between said entrance section and said casing slot; and said cutter being movable between said entrance section and said casing guide slot through said connecting section.

14. The apparatus of claim 3, wherein said cutter is larger than said guide slot in said cover, whereby as said cutter moves through said guide slot in said cover, said cover is blocked from being opened by said cutter;

an enlarged opening in said cover at a start terminal position for motion of said cutter; said enlarged opening being sized such that said cover may be opened and said cutter can pass through said enlarged opening when said cutter is at its said start terminal position.

15. The apparatus of claim 14, wherein said cutter is separable from and removable from said casing and said cover.

16. The apparatus of claim 15, further comprising a guide slot in said casing surface aligned with said guide slot in said cover for receiving ad guiding said cutter, whereby said cutter is guided by both said cover guide slot and said casing guide slot.

* * * * *